No. 698,909. Patented Apr. 29, 1902.
G. P. DORRIS.
AUTOMOBILE.
(Application filed Oct. 19, 1900.)
(No Model.)
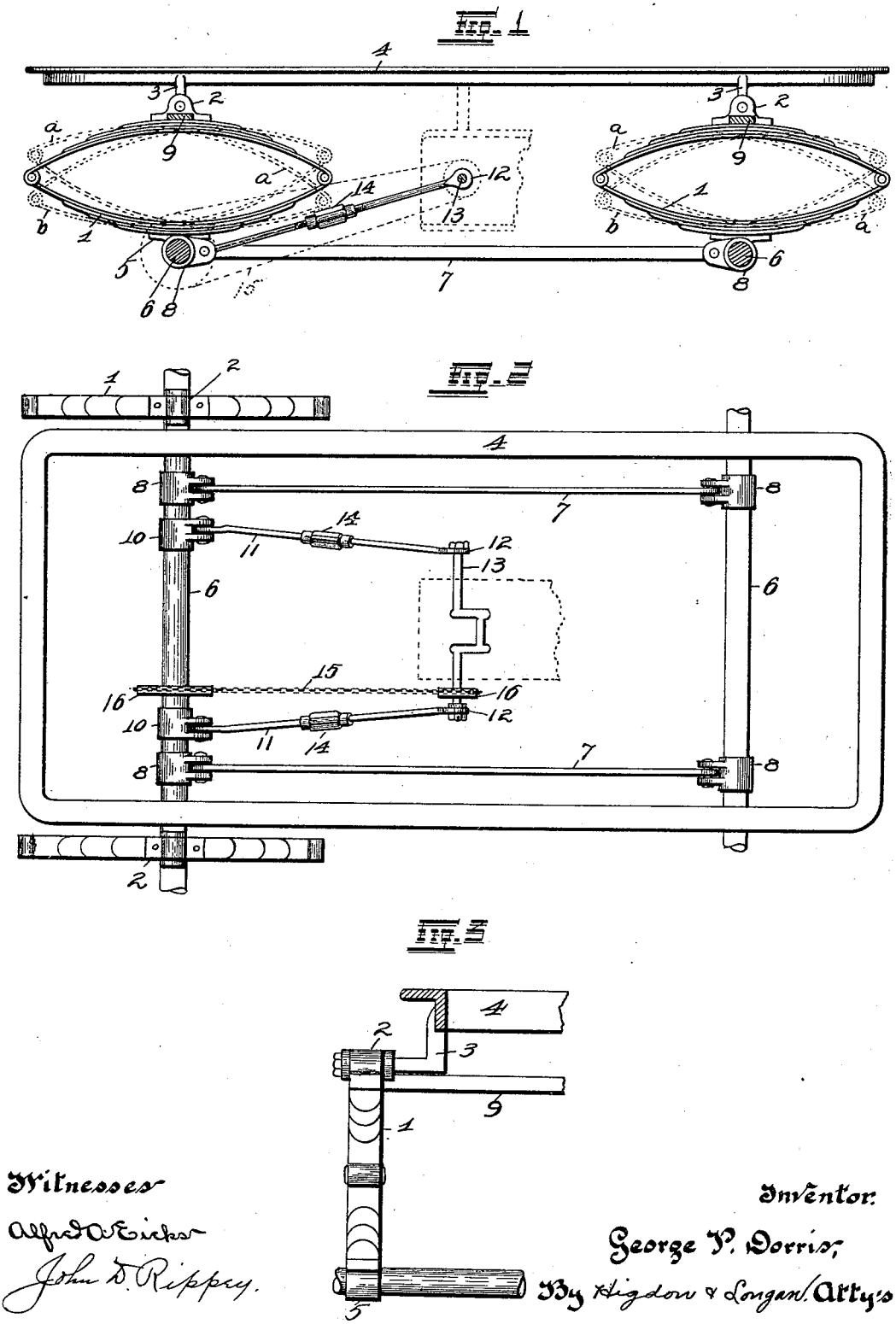
Witnesses
Alfred A. Eicks
John D. Rippey.
Inventor:
George P. Dorris,
By Higdon & Longan, Att'ys

UNITED STATES PATENT OFFICE.

GEORGE P. DORRIS, OF ST. LOUIS, MISSOURI, ASSIGNOR OF ONE-HALF TO ST. LOUIS MOTOR CARRIAGE CO., OF ST. LOUIS, MISSOURI.

AUTOMOBILE.

SPECIFICATION forming part of Letters Patent No. 698,909, dated April 29, 1902.

Application filed October 19, 1900. Serial No. 33,614. (No model.)

*To all whom it may concern:*

Be it known that I, GEORGE P. DORRIS, of the city of St. Louis, State of Missouri, have invented certain new and useful Improvements in Automobiles, of which the following is a full, clear, and exact description, reference being had to the accompanying drawings, forming a part hereof.

This invention relates to automobiles; and it consists of the novel construction, combination, and arrangement of parts hereinafter shown, described, and claimed.

The object of this invention is to provide improved means by which the springs of the vehicle will be automatically adjusted by the manipulation of the tension-rods used for adjusting the propelling mechanism.

The specific object is to dispense with any strain whatever upon the springs by the adjustment of the propelling mechanism.

My invention consists of a plurality of vehicle-springs; hinge-blocks secured to the upper side of each spring; hinge-brackets connected to the hinge-blocks; a frame or bed connected to the hinge-brackets; bearing-blocks connected to the lower sides of said springs; axles pivotally mounted in said bearing-blocks; reaches connecting the forward bearing-blocks with the corresponding rear bearing-blocks, there being hinge-joints in said connections, as required, to frame the axles together and to the wagon-bed by hinge-joints, so that the axles may be moved forwardly or backwardly relative to the bed; adjusting-bars pivotally connected to the rear axle; a crank-shaft rigidly mounted upon the frame of the body of the wagon, the forward ends of said adjusting-bars being connected to the crank-shaft or to the frame and there being turnbuckles incorporated into said bars, as required, to lengthen or shorten said bars, so that by the operation of said turnbuckles the axles are moved forwardly or backwardly relative to the wagon-bed; a sprocket-wheel mounted upon the rear axle; a second sprocket mounted upon the crank-shaft, a sprocket-chain connecting said sprocket-wheel, so that the movement of the running-gear backwardly or forwardly relative to the bed tightens or loosens the sprocket-chain.

Figure 1 is a longitudinal sectional view of my complete invention, shown in position on the frame. Fig. 2 is a top plan view of the same with the cross-bars removed for clearness. Fig. 3 is a detail end view of one of the springs, showing its connection to the frame which is shown in section.

In the construction of the device as shown I provide a plurality of ordinary vehicle-springs 1, each provided on its upper surface with a hinge-block 2, by which it is hingedly secured to a hinge-bracket 3, formed integral with the frame or body 4. To the under surface of each of said springs is a bearing-block 5, arranged to encircle the vehicle-axles 6 and to support said springs thereon. The rear and front axles 6 are connected and held in alinement by reach-bars 7, their ends being pivotally secured in hinge-joint collars 8, located upon said axles. The springs located upon each of said axles are held in horizontal alinement by means of cross-bars 9, the ends of which are connected to the hinge-blocks 2. Upon the rear axle I also provide a pair of hinge-joint collars 10, both of which are loosely mounted thereon, and between the ears of said collars are pivotally secured the ends of the adjusting-bars 11, which are arranged in pairs to correspond with said collars. The ends 12 of the rods 11 are supported by the engine-shaft 13.

It will be observed that each of the adjusting-rods 11 is constructed of two sections, which are connected by a turnbuckle 14, the purpose of which is to lengthen or shorten the same, as desired.

The object of lengthening or shortening the adjusting-rods 11 is to adjust the sprocket-chain 15 upon the sprocket-wheels 16, forming a part of the propelling mechanism.

In the drawings the engine and propelling mechanism have been indicated by dotted lines, for the reason that the same is not new and I do not deem it necessary to show it, for the reason that any motive power may be used for operating the mechanism. The purpose of the arrangement of the springs in connection with the axles and body is to allow said springs to assume the various positions, as shown by dotted lines, when the adjusting-rods 11 are lengthened or shortened to compensate the adjustment of the sprocket-chain, thus preventing any strain upon said springs which has heretofore been detrimental and caused said springs to break. When the adjusting-rod is lengthened to tighten the sprocket-chain 15, the springs will assume the position as shown by dotted lines $a$, and when the same is shortened the springs will assume the position as shown by dotted lines $b$. (See Fig. 1.)

I claim—

1. In a motor-vehicle, a plurality of springs; hinge-blocks fixed to the upper sides of the springs; hinge-brackets connected to the hinge-blocks; a frame or bed connected to the hinge-brackets; bearing-blocks connected to the lower sides of the springs; axles rotatably mounted in said bearing-blocks; reaches connecting the forward bearing-blocks to the corresponding rear bearing-blocks, said reaches being pivotally mounted; hinge-collars mounted upon the rear axle; a crank-shaft mounted upon the frame; turnbuckles adjusting-bars connecting the hinge-collars of the axle to the crank-shaft or the frame; a sprocket-wheel upon the rear axle; a sprocket-wheel upon the crank-shaft; and a chain connecting the sprocket-wheels so that by manipulating said buckles, the entire running-gear is moved forwardly or backwardly, relative to the bed, so that the sprocket-chain is loosened or tightened, substantially as specified.

2. In a motor-vehicle, a running-gear having the forward axle and rear axle rigidly connected by hinged reaches; springs pivotally mounted upon said axles; hinges extending upwardly from said springs; a wagon-bed connected to said hinges; a crank-shaft mounted in the frame or wagon-bed; a sprocket-wheel upon said crank-shaft; a sprocket-wheel upon the rear axle; a chain connecting said sprocket-wheels; and an adjustable or turnbuckle connection between the running-gear and the bed as required to move the running-gear forwardly or backwardly in a body relative to the bed, so as to tighten or loosen the sprocket-chain, substantially as specified.

In testimony whereof I affix my signature in presence of two witnesses.

GEORGE P. DORRIS.

Witnesses:
 ALFRED A. EICKS,
 JOHN D. RIPPEY.